United States Patent
Deng (10) Patent No.: US 10,146,356 B2
(45) Date of Patent: Dec. 4, 2018

(54) METHOD FOR CONTROLLING STATE OF TOUCH SCREEN, TOUCH SCREEN, AND PORTABLE TOUCH TERMINAL

(71) Applicant: Shenzhen Goodix Technology Co., Ltd., Shenzhen, Guangdong (CN)

(72) Inventor: Gengchun Deng, Guangdong (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 27 days.

(21) Appl. No.: 14/785,352

(22) PCT Filed: Apr. 25, 2014

(86) PCT No.: PCT/CN2014/076294
§ 371 (c)(1),
(2) Date: Oct. 19, 2015

(87) PCT Pub. No.: WO2014/183549
PCT Pub. Date: Nov. 20, 2014

(65) Prior Publication Data
US 2016/0085360 A1 Mar. 24, 2016

(30) Foreign Application Priority Data
May 14, 2013 (CN) .......................... 2013 1 0177485

(51) Int. Cl.
G06F 3/041 (2006.01)
G06F 3/044 (2006.01)
G06F 1/32 (2006.01)

(52) U.S. Cl.
CPC ............ G06F 3/0416 (2013.01); G06F 3/044 (2013.01); G06F 1/3262 (2013.01)

(58) Field of Classification Search
CPC ....... G06F 1/3262; G06F 3/0416; G06F 3/044
See application file for complete search history.

(56) References Cited

U.S. PATENT DOCUMENTS

2008/0048990 A1* 2/2008 Cho ...................... G06F 3/0416
345/173
2011/0001708 A1* 1/2011 Sleeman ............... G06F 3/0416
345/173

(Continued)

FOREIGN PATENT DOCUMENTS

CN 102147656 A 8/2011
CN 102855033 A 1/2013

(Continued)

OTHER PUBLICATIONS

International Search Report of PCT Patent Application No. PCT/CN2014/076294 dated Aug. 4, 2014.

(Continued)

*Primary Examiner* — Chun-Nan Lin (57) ABSTRACT

A method for controlling a state of a touch screen is provided. The touch screen includes a touch sensor and the touch sensor includes multiple touch nodes, the control method including the following steps: S1. detecting that detected capacitance values of touch nodes in a preset particular region on the touch sensor uniformly change within a preset time length; S2. obtaining a quantity of touch nodes whose change in the detected capacitance value is greater than a preset detected capacitance threshold value; and S3. when the quantity of touch nodes whose change in the detected capacitance value is greater than the preset detected capacitance threshold value is greater than a preset quantity, controlling the touch screen to perform state switching. The control method is simple and convenient and does not require any complex detection circuit. A touch screen and a portable touch terminal having the touch screen are also provided.

10 Claims, 5 Drawing Sheets

(56) References Cited

U.S. PATENT DOCUMENTS

| | | | |
|---|---|---|---|
| 2012/0068965 A1* | 3/2012 | Wada | G06F 3/044 345/174 |
| 2012/0268422 A1* | 10/2012 | Hirakawa | G06F 1/3203 345/174 |
| 2013/0106776 A1* | 5/2013 | Park | G06F 3/04883 345/174 |
| 2013/0141382 A1* | 6/2013 | Simmons | G06F 3/044 345/174 |
| 2014/0210780 A1* | 7/2014 | Lee | G06F 3/03545 345/174 |
| 2014/0333542 A1* | 11/2014 | Barreca | G06F 1/1669 345/169 |

FOREIGN PATENT DOCUMENTS

| | | | | |
|---|---|---|---|---|
| CN | 103019796 A | | 4/2013 | |
| KR | 20130008482 | * | 1/2013 | ............ G06F 3/044 |

OTHER PUBLICATIONS

1st Office Action of counterpart Chinese Patent Application No. 201310177485.7 dated Jun. 30, 2015.

* cited by examiner

METHOD FOR CONTROLLING STATE OF TOUCH SCREEN, TOUCH SCREEN, AND PORTABLE TOUCH TERMINAL

TECHNICAL FIELD

The present invention relates to the technical field of touch screens, and particularly to a method for controlling a state of a touch screen, a touch screen, and a portable touch terminal having the touch screen.

BACKGROUND ART

With the development of man-machine interface technologies, touch sensing technologies that provide comfort and convenience in operation have been widely used. Especially in the field of consumer electronics such as notebook computers, mobile phones and MP3, a large number of touchpads, touch screens and touch buttons are used in such electronic products. Among the touch technologies, the capacitive touch technology is an advanced one, and typical applications thereof are, for example, iPad and iPhone. The detection principle of the capacitive touch technology is: identifying a touch state according to a small change in capacitance that occurs when a human body (or another object) approaches a detection electrode and changes the original electric field.

Figure 1:
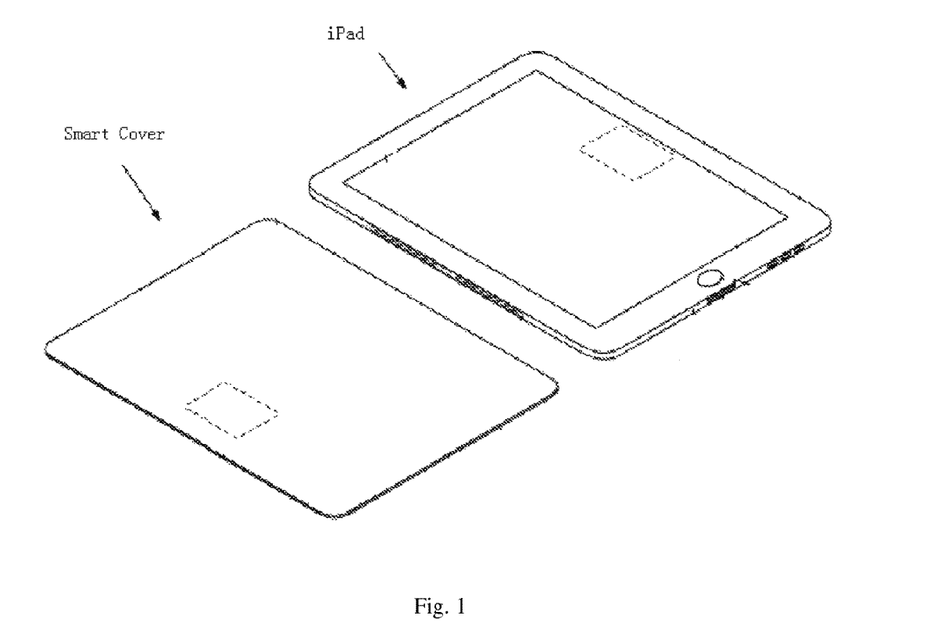
FIG. 1 is a schematic view of an iPad product with a Smart Cover in the prior art.

In the prior art, as shown in FIG. 1, a Smart Cover (cover) used on an iPad product is provided with a sensor that can sense a magnetic field, such as a Hall effect sensor, to wake up the screen or put the screen into a sleep state. When the Smart Cover is closed, the iPad enters the sleep state automatically. When the Smart Cover is opened, the iPad is immediately woken up without the need to press any button. Means of implementation is as follows: the Hall effect sensor generates a signal by sensing the presence of a magnetic field, the signal being used to change an operation state of a touch-screen electronic device, that is, when the Smart Cover approaches or moves away from the iPad, a magnetic field generated by an electric field element on the Smart Cover causes the Hall effect sensor to generate such a signal. However, for this method, an electric field element needs to be added into the cover, and a complex detection circuit needs to be provided in the iPad product.

The prior art is disadvantageous in that because an electric field element needs to be added into the cover and a corresponding detection circuit needs to be provided in the touch-screen electronic device, the costs cannot be reduced.

SUMMARY

An objective of the present invention is to solve one of the above technical defects to some extent.

Accordingly, a first objective of the present invention is to provide a method for controlling a state of a touch screen, in which the state of the touch screen is controlled by detecting changes in the detected capacitance value in a preset particular region on the touch sensor in the touch screen; therefore, the control method is simple and convenient.

A second objective of the present invention is to provide a touch screen. A third objective of the present invention is to further provide a portable touch terminal having the touch screen.

To achieve the above objectives, an embodiment of a first aspect of the present invention provides a method for controlling a state of a touch screen, where the touch screen includes a touch sensor and the touch sensor includes multiple touch nodes, the control method including the following steps: S1. detecting that detected capacitance values of touch nodes in a preset particular region on the touch sensor uniformly change within a preset time length; S2. obtaining a quantity of touch nodes whose change in the detected capacitance value is greater than a preset detected capacitance threshold value; and S3. when the quantity of touch nodes whose change in the detected capacitance value is greater than the preset detected capacitance threshold value is greater than a preset quantity, controlling the touch screen to perform state switching.

In the method for controlling a state of a touch screen according to this embodiment of the present invention, by detecting changes in the detected capacitance value in the preset particular region on the touch sensor in the touch screen, the touch screen is controlled to perform state switching, which is simple and convenient to operate and makes it convenient for use by people. In addition, no complex detection circuit needs to be provided in the touch screen, so that the costs are reduced.

In one embodiment of the present invention, the controlling the touch screen to perform state switching specifically includes: when the detected capacitance values of the touch nodes whose change in the detected capacitance value is greater than the preset detected capacitance threshold value change from a first detected capacitance value to a second detected capacitance value, controlling the touch screen to enter a sleep state; or when the detected capacitance values of the touch nodes whose change in the detected capacitance value is greater than the preset detected capacitance threshold value change from the second detected capacitance value to the first detected capacitance value, controlling the touch screen to enter an active state.

In another embodiment of the present invention, when the first detected capacitance value is a reference value, if the detected capacitance values of the touch nodes whose change in the detected capacitance value is greater than the preset detected capacitance threshold value change from the reference value to a third detected capacitance value, the touch screen is controlled to enter the sleep state, or if the detected capacitance values of the touch nodes whose change in the detected capacitance value is greater than the preset detected capacitance threshold value change from the third detected capacitance value back to the reference value, the touch screen is controlled to enter the active state.

In one embodiment of the present invention, the preset particular region includes a first region and a second region, and before the step S2, the control method further includes:

detecting whether changes in the detected capacitance value of touch nodes in the first region are greater than changes in the detected capacitance value of touch nodes in the second region; and if it is detected that the changes in the detected capacitance value of the touch nodes in the first region are greater than the changes in the detected capacitance value of the touch nodes in the second region, performing the step S2.

In addition, in this embodiment of the present invention, the method for controlling a state of a touch screen further includes: if it is detected that the detected capacitance values in the preset particular region do not change within a preset period of time since the touch screen is controlled to enter the active state, controlling the touch screen to enter the sleep state.

To achieve the above objectives, an embodiment of a second aspect of the present invention provides a touch screen, including: a touch sensor, the touch sensor including multiple touch nodes; a detection module, configured to detect whether detected capacitance values of touch nodes in a preset particular region on the touch sensor uniformly change within a preset time length; and a control module, configured to: when the detected capacitance values of the touch nodes in the preset particular region on the touch sensor uniformly change within the preset time length, obtain a quantity of touch nodes whose change in the detected capacitance value is greater than a preset detected capacitance threshold value, and when the quantity of touch nodes whose change in the detected capacitance value is greater than the preset detected capacitance threshold value is greater than a preset quantity, control the touch screen to perform state switching.

In the touch screen according to this embodiment of the present invention, the detection module detects changes in the detected capacitance value in the preset particular region on the touch sensor, and according to the changes in the detected capacitance value of touch nodes in the preset particular region, the control module controls the touch screen to perform state switching, which is simple and convenient to operate and makes it convenient for use by people. In addition, no complex detection circuit needs to be provided in the touch screen, so that the costs are reduced.

In one embodiment of the present invention, when the detection module detects that the detected capacitance values of the touch nodes whose change in the detected capacitance value is greater than the preset detected capacitance threshold value change from a first detected capacitance value to a second detected capacitance value, the control module controls the touch screen to enter a sleep state; or when the detected capacitance values of the touch nodes whose change in the detected capacitance value is greater than the preset detected capacitance threshold value change from the second detected capacitance value to the first detected capacitance value, the control module controls the touch screen to enter an active state.

In another embodiment of the present invention, when the first detected capacitance value is a reference value, if the detection module detects that the detected capacitance values of the touch nodes whose change in the detected capacitance value is greater than the preset detected capacitance threshold value change from the reference value to a third detected capacitance value, the control module controls the touch screen to enter the sleep state, or if the detection module detects that the detected capacitance values of the touch nodes whose change in the detected capacitance value is greater than the preset detected capacitance threshold value change from the third detected capacitance value back to the reference value, the control module controls the touch screen to enter the active state.

In one embodiment of the present invention, the preset particular region includes a first region and a second region, and when the detection module detects that changes in the detected capacitance value of touch nodes in the first region are greater than changes in the detected capacitance value of touch nodes in the second region, the control module obtains a quantity of touch nodes whose change in the detected capacitance value is greater than the preset detected capacitance threshold value.

In addition, the present invention further provides a portable touch terminal, including the touch screen provided in the embodiment of the second aspect of the present invention. No complex sampling circuit needs to be provided in the touch screen in the portable touch terminal, which reduces the costs, satisfies people's demands in daily life, and improves user experience.

Additional aspects and advantages of the present invention will be set forth in the description which follows, and in part will be apparent from the description below, or may be learned by practice of the present invention.

DESCRIPTION OF THE FIGURES

The above and/or additional aspects and advantages of the present invention will become apparent and readily appreciated from the following description of the embodiments, taken in conjunction with the accompanying drawings, in which.

DETAILED DESCRIPTION OF THE EMBODIMENTS

A method for controlling a state of a touch screen, a touch screen and a portable touch terminal having the touch screen that are provided by embodiments of the present invention are described below with reference to the accompanying drawings.

Figure 2:
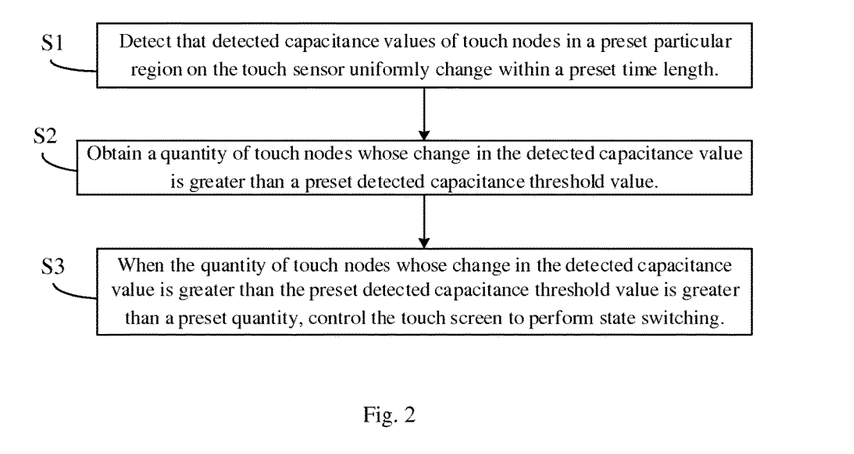
FIG. 2 is a flowchart of a method for controlling a state of a touch screen according to an embodiment of the present invention.

FIG. 2 is a flowchart of a method for controlling a state of a touch screen according to an embodiment of the present invention. The touch screen includes a touch sensor, and the touch sensor includes multiple touch nodes. Specifically, in one case, the touch sensor includes multiple sensing electrodes and multiple driving electrodes, the multiple sensing electrodes and the multiple driving electrodes are arranged in rows and columns, and the multiple touch nodes are formed at intersections of the multiple sensing electrodes and the multiple driving electrodes. For example, the touch nodes are arranged in a matrix. Alternatively, in another case, the touch sensor includes multiple detection electrodes only, each detection electrode being one touch node. As shown in FIG. 2, the method for controlling a state of a touch screen includes the following steps:

S1. Detect that detected capacitance values of touch nodes in a preset particular region on the touch sensor uniformly change within a preset time length.

The preset particular region refers to a region formed by some or all of the touch nodes on the touch sensor. For example, a region of the entire cover that covers the surface of the touch sensor may be set as the particular region, so as to detect changes in the detected capacitance value of all the touch nodes in that particular region; alternatively, a region of a magnetic material (such as a magnet) on the cover that covers the surface of the touch sensor may be set as the particular region, so as to detect changes in the detected capacitance value of all the touch nodes in that particular region.

The detected capacitance values of the touch nodes in the particular region uniformly change, that is, the detected capacitance values of the touch nodes all increases or decreases. For the changes in the detected capacitance value of all the touch nodes in the particular region, their tolerances must be within a certain threshold range, and the duration of change also needs to be within a preset time length (for example, of 1 to 2 seconds), so as to avoid misjudgment caused by factors such as external environment (for example, the temperature) that change slowly.

S2. Obtain a quantity of touch nodes whose change in the detected capacitance value is greater than a preset detected capacitance threshold value.

S3. When the quantity of touch nodes whose change in the detected capacitance value is greater than the preset detected capacitance threshold value is greater than a preset quantity, control the touch screen to perform state switching.

In this embodiment of the present invention, the preset quantity is determined according to the area of the touch screen and properties of the cover (for example, whether the covers includes a magnetic material). To provide a firmer attachment between the cover and the touch screen, generally a magnetic material is provided in the cover. In this embodiment, the preset quantity may be preset to be equal to a quantity of some or all the touch nodes in the surface of the touch sensor that is covered by the entire cover, or may be preset to a quantity of some or all the touch nodes in the surface of the touch sensor that is covered by the magnetic material (such as a magnet) on the cover.

That is, in this embodiment of the present invention, when the cover on the touch screen is opened or closed, the detected capacitance values of the touch nodes in a large area on the touch sensor in the touch screen uniformly change, a quantity of touch nodes whose change in the detected capacitance value is greater than the preset detected capacitance threshold value is calculated, and according to the quantity of touch nodes whose change in the detected capacitance value is greater than the preset detected capacitance threshold value, it can be determined whether the cover of the touch screen is in an open or closed state, so as to control the touch screen to perform state switching.

In one embodiment of the present invention, the controlling the touch screen to perform state switching specifically includes: when the detected capacitance values of the touch nodes whose change in the detected capacitance value is greater than the preset detected capacitance threshold value change from a first detected capacitance value to a second detected capacitance value, controlling the touch screen to enter a sleep state; or when the detected capacitance values of the touch nodes whose change in the detected capacitance value is greater than the preset detected capacitance threshold value change from the second detected capacitance value to the first detected capacitance value, controlling the touch screen to enter an active state. When the detected capacitance values of the touch nodes whose change in the detected capacitance value is greater than the preset detected capacitance threshold value change from the first detected capacitance value to the second detected capacitance value, if the second detected capacitance value is greater than the first detected capacitance value, the touch screen is controlled to enter the sleep state; or if the second detected capacitance value is less than the first detected capacitance value, the touch screen is controlled to enter the active state.

Furthermore, in another embodiment of the present invention, when the first detected capacitance value is a reference value, if the detected capacitance values of the touch nodes whose change in the detected capacitance value is greater than the preset detected capacitance threshold value change from the reference value to a third detected capacitance value, the touch screen is controlled to enter the sleep state, or if the detected capacitance values of the touch nodes whose change in the detected capacitance value is greater than the preset detected capacitance threshold value change from the third detected capacitance value back to the reference value, the touch screen is controlled to enter the active state. The reference value is less than the third detected capacitance value.

Figure 3:
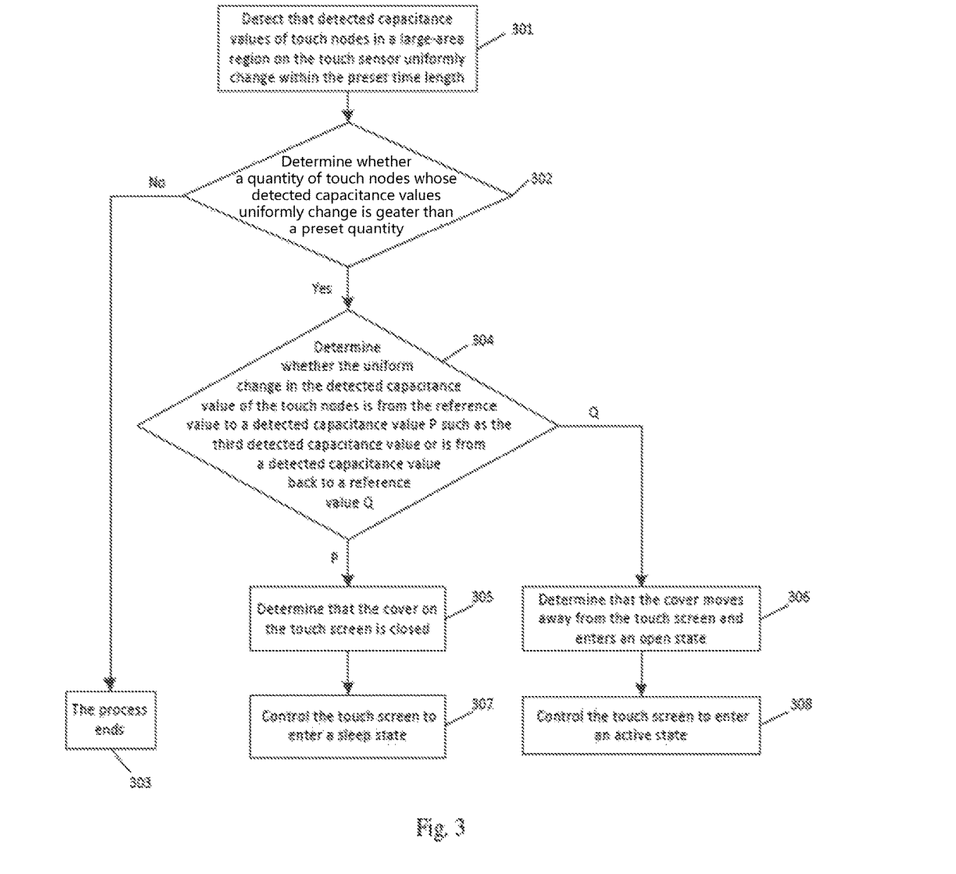
FIG. 3 is a flowchart of a method for controlling a state of a touch screen according to a specific embodiment of the present invention.

Specifically, in one embodiment of the present invention, as shown in FIG. 3, the method for controlling a state of a touch screen includes the following steps:

S301. Detect that detected capacitance values of touch nodes in a large-area region on the touch sensor uniformly change within the preset time length, where the changes in the detected capacitance value of the touch nodes in the large-area region whose detected capacitance values uniformly change are greater than the preset detected capacitance threshold value.

S302. Determine whether a quantity of touch nodes whose detected capacitance values uniformly change is greater than a preset quantity. If so, perform step S304; if not, perform step S303.

This step is provided for the purpose of detecting whether the uniform change in the detected capacitance value of the preset quantity of touch nodes is caused by opening or closing of the cover.

When the cover is opened, the detected capacitance value of the touch node remains at the reference value. When the cover is closed, the detected capacitance value between electrodes or a detected ground capacitance value of the detection electrode changes, and the detected capacitance value of the touch node changes from the reference value to a certain detected capacitance value such as the third detected capacitance value. On the contrary, when the cover is opened, the detected capacitance value between the driving electrode and the sensing electrode also changes, and the detected capacitance value of the touch node changes from a certain detected capacitance value such as the third detected capacitance value back to the reference value.

It should be noted that in other embodiments of the present invention, the reference value may be constantly dynamically updated, for example, if the detected capacitance value of the touch node changes from a reference value A to a detected capacitance value B, the reference value is dynamically updated to the detected capacitance value B, where the dynamic update is performed on the premise that all conditions of a reference updating module are satisfied. Likewise, if the detected capacitance value of the touch node changes from one detected capacitance value back to another detected capacitance value C, the reference value is dynamically updated to the detected capacitance value C, where the dynamic update is also performed on the premise that all conditions of the reference updating module are satisfied. If the detected capacitance value C is less than the detected capacitance value B, it is considered that the process of changing from the detected capacitance value B to the detected capacitance value C is reverse to the process of changing from the reference value A to the detected capacitance value B. For example, if the change from the reference value A to the detected capacitance value B corresponds to a process of closing the cover, the change from the detected capacitance value B to the detected capacitance value C corresponds to a process of opening the cover.

S303. The process ends.

S304. Further determine whether the uniform change in the detected capacitance value of the touch nodes is from the reference value to a detected capacitance value P such as the third detected capacitance value or is from a detected capacitance value back to a reference value Q. If the uniform change in the detected capacitance value of the touch nodes is from the reference value to the detected capacitance value P, perform step S305; if the uniform change in the detected capacitance value of the touch nodes is from a detected capacitance value back to the reference value Q, perform step S306.

S305. Determine that the cover on the touch screen is closed, and perform step S307.

S306. Determine that the cover moves away from the touch screen and enters an open state, and perform step S308.

S307. Control the touch screen to enter a sleep state.

S308. Control the touch screen to enter an active state, that is, wake up the touch screen. In one embodiment of the present invention, an area threshold is determined according to the area of the touch sensor and properties of the cover (for example, whether the covers includes a magnetic material). That is, in this embodiment, the area threshold is preset, and for example, may be preset to be less than or equal to the area of the touch screen, or may be preset to be less than or equal to the area of the touch screen that is covered by the magnetic material.

Figure 4:
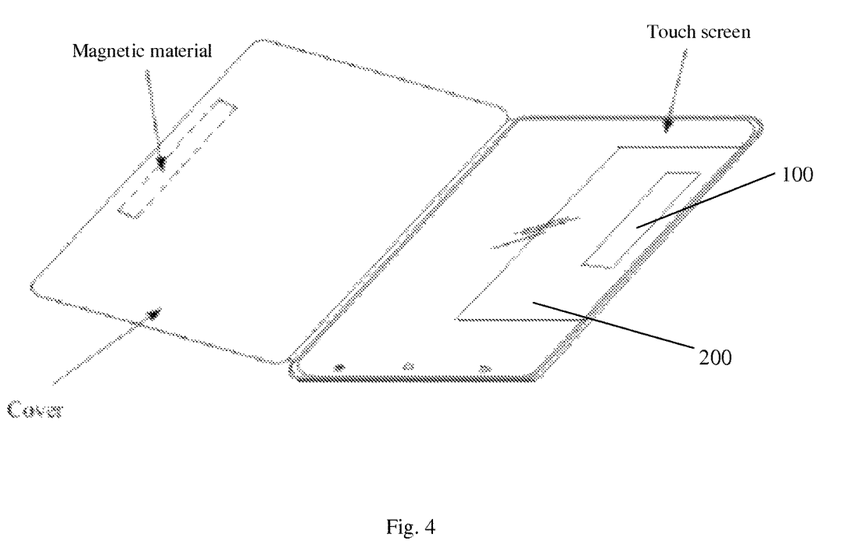
FIG. 4 is a schematic structural view of a touch screen with a cover having a magnetic material according to an embodiment of the present invention.

In one embodiment of the present invention, as shown in FIG. 4, the preset particular region includes a first region 100 and a second region 200, and before the step S2, the control method further includes: detecting whether changes in the detected capacitance value of touch nodes in the first region are greater than changes in the detected capacitance value of touch nodes in the second region; and if it is detected that the changes in the detected capacitance value of the touch nodes in the first region are greater than the changes in the detected capacitance value of the touch nodes in the second region, performing the step S2. A magnetic material such as a magnet is generally provided in the first region 100.

Figure 5:
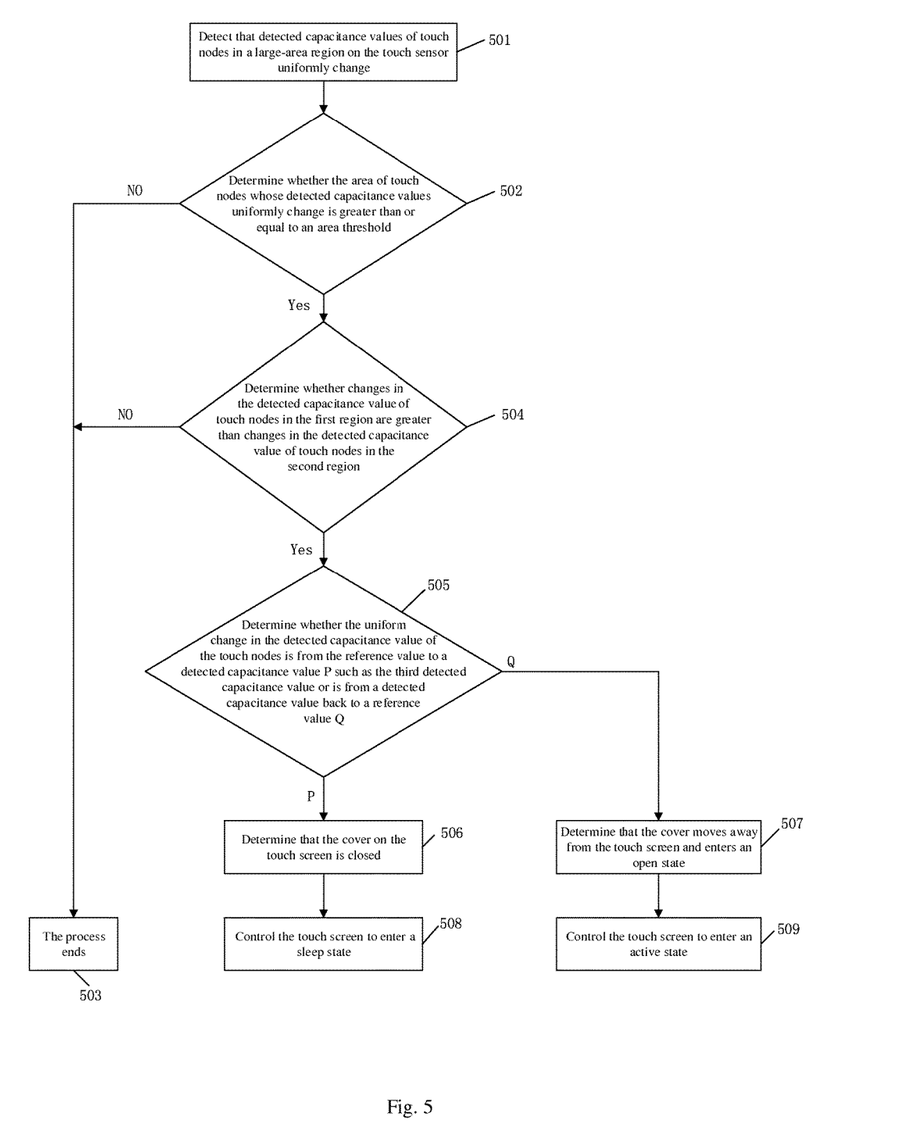
FIG. 5 is a flowchart of a method for controlling a state of a touch screen according to a preferred embodiment of the present invention.

Specifically, as shown in FIG. 5, the method for controlling a state of a touch screen includes the following steps:

S501. Detect that detected capacitance values of touch nodes in a large-area region on the touch sensor uniformly change, where the changes in the detected capacitance value of the touch nodes in the large-area region whose detected capacitance values uniformly change are greater than the preset detected capacitance threshold value.

S502. Determine whether the area of touch nodes whose detected capacitance values uniformly change is greater than or equal to an area threshold. If so, perform step S504; if not, perform step S503.

That is, a quantity of touch nodes whose detected capacitance values uniformly change is obtained, and the area formed by an array of touch nodes whose detected capacitance values uniformly change can be obtained according to the quantity of touch nodes whose detected capacitance values uniformly change.

S503. The process ends.

S504. Determine whether changes in the detected capacitance value of touch nodes in the first region are greater than changes in the detected capacitance value of touch nodes in the second region. If so, perform step S505; if not, perform step S503.

It should be noted that when the cover is covered on the touch screen, the cover is absorbed to the touch screen, and a change in the detected capacitance value caused by the magnetic material is greater than that caused by a protective cover, and therefore, the changes in the detected capacitance value of the touch nodes in the first region are greater than the changes in the detected capacitance value of the touch nodes in the second region.

S505. Further determine whether the uniform change in the detected capacitance value of the touch nodes is from the reference value to a detected capacitance value P such as the third detected capacitance value or is from a detected capacitance value back to a reference value Q. If the uniform change in the detected capacitance value of the touch nodes is from the reference value to the detected capacitance value P, perform step S506; if the uniform change in the detected capacitance value of the touch nodes is from a detected capacitance value back to the reference value Q, perform step S507.

S506. Determine that the cover on the touch screen is closed, and perform step S508.

S507. Determine that the cover moves away from the touch screen and enters an open state, and perform step S509.

S508. Control the touch screen to enter a sleep state.

S509. Control the touch screen to enter an active state, that is, wake up the touch screen.

In addition, in this embodiment of the present invention, the method for controlling a state of a touch screen further includes: if it is detected that the detected capacitance values in the preset particular region do not change within a preset period of time since the touch screen is controlled to enter the active state, controlling the touch screen to enter the sleep state. That is, when the cover moves away from the touch screen and enters the open state, the touch screen is woken up; and if no operation is performed on the touch screen within a time period of, for example, 30 seconds, the touch screen is controlled to enter the sleep state.

Therefore, in the present invention, it is determined, by detecting uniform changes in the detected capacitance value in the preset particular region on the touch sensor, whether the cover is in an opened or closed state, so as to control the touch screen to enter the active or sleep state.

In the method for controlling a state of a touch screen according to this embodiment of the present invention, by detecting changes in the detected capacitance value in the preset particular region on the touch sensor in the touch screen, the touch screen is controlled to perform state switching, which is simple and convenient to operate and makes it convenient for use by people. In addition, no complex detection circuit needs to be provided in the touch screen, so that the costs are reduced.

Figure 6:
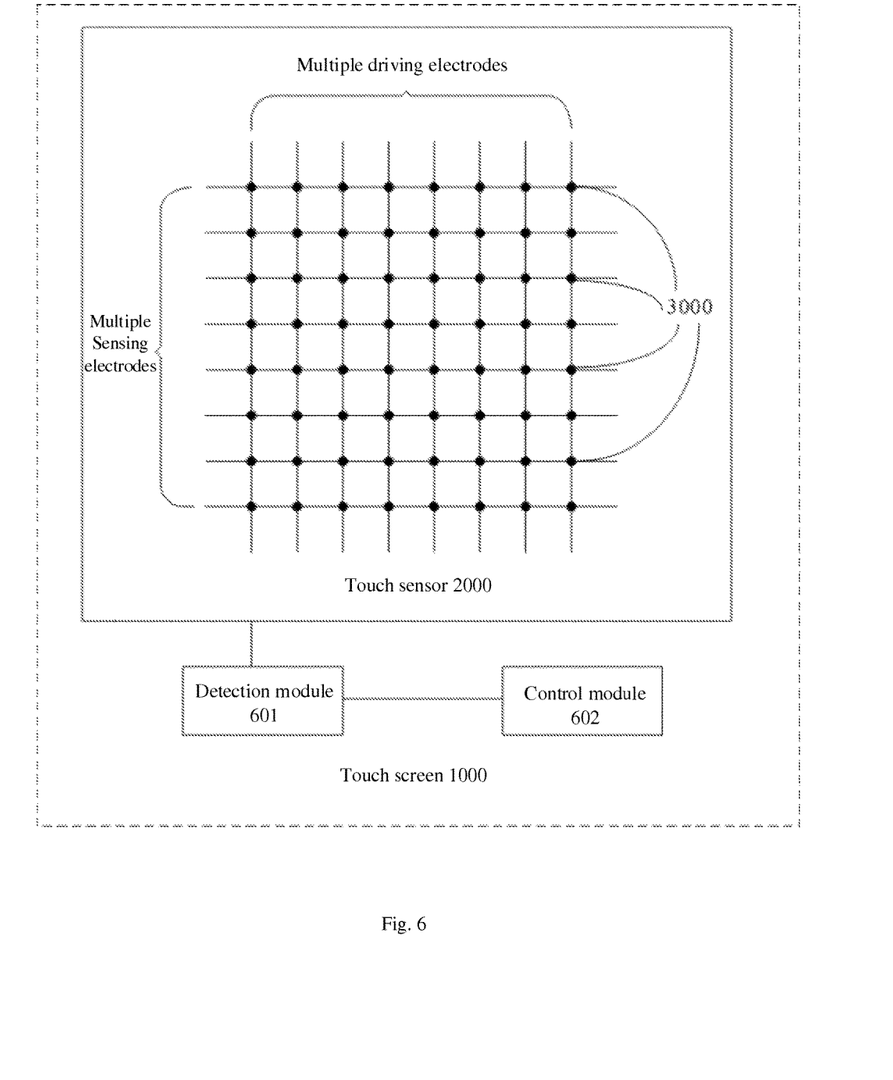
FIG. 6 is a schematic block diagram of a touch screen according to an embodiment of the present invention.

FIG. 6 is a schematic block diagram of a touch screen according to an embodiment of the present invention. As shown in FIG. 6, the touch screen 1000 includes a touch sensor 2000, a detection module 601, and a control module 602. The touch sensor 2000 includes multiple touch nodes 3000. Specifically, in one case, the touch sensor 2000 includes multiple sensing electrodes and multiple driving electrodes, the multiple sensing electrodes and the multiple driving electrodes are arranged in rows and columns, and multiple touch nodes 3000 are formed at intersections of the multiple sensing electrodes and the multiple driving electrodes. For example, the touch nodes are arranged in a matrix, as shown in FIG. 6. Alternatively, in another case, the touch sensor includes multiple detection electrodes only, each detection electrode being one touch node 3000. The detection module 601 is configured to detect whether detected capacitance values of touch nodes in a preset particular region on the touch sensor 2000 uniformly change within a preset time length; and the control module 602 is configured to: when the detected capacitance values of the touch nodes in the preset particular region on the touch sensor uniformly change within the preset time length, obtain a quantity of touch nodes whose change in the detected capacitance value is greater than a preset detected capacitance threshold value, and when the quantity of touch nodes whose change in the detected capacitance value is greater than the preset detected capacitance threshold value is greater than a preset quantity, control the touch screen 1000 to perform state switching. In this embodiment of the present invention, the preset quantity is determined according to the size of the touch screen 1000 and properties of a cover.

In one embodiment of the present invention, when the detection module 601 detects that the detected capacitance values of the touch nodes whose change in the detected capacitance value is greater than the preset detected capacitance threshold value change from a first detected capacitance value to a second detected capacitance value, the control module 602 controls the touch screen 1000 to enter a sleep state. When the detection module 601 detects that the detected capacitance values of the touch nodes whose change in the detected capacitance value is greater than the preset detected capacitance threshold value change from the second detected capacitance value to the first detected capacitance value, the control module 602 controls the touch screen 1000 to enter an active state. When the detected capacitance values of the touch nodes whose change in the detected capacitance value is greater than the preset detected capacitance threshold value change from the first detected capacitance value to the second detected capacitance value, if the second detected capacitance value is greater than the first detected capacitance value, the touch screen is controlled to enter the sleep state; or if the second detected capacitance value is less than the first detected capacitance value, the touch screen is controlled to enter the active state.

In another embodiment of the present invention, when the first detected capacitance value is a reference value, if the detection module 601 detects that the detected capacitance values of the touch nodes whose change in the detected capacitance value is greater than the preset detected capacitance threshold value change from the reference value to a third detected capacitance value, the control module 602 controls the touch screen 1000 to enter the sleep state, or if the detection module 601 detects that the detected capacitance values of the touch nodes whose change in the detected capacitance value is greater than the preset detected capacitance threshold value change from the third detected capacitance value back to the reference value, the control module 602 controls the touch screen 1000 to enter the active state.

In this embodiment of the present invention, when a cover on the touch screen 1000 is opened or closed, the detected capacitance values of the touch nodes in a large area on the touch sensor 2000 in the touch screen 1000 uniformly change. When the cover is opened, the detected capacitance value of the touch node remains at the reference value. When the cover is closed, the detected capacitance value between electrodes changes, and the detected capacitance value of the touch node changes from the reference value to a certain detected capacitance value such as the third detected capacitance value. On the contrary, when the cover is opened, the detected capacitance value between electrodes also changes, and the detected capacitance value of the touch node changes from a certain detected capacitance value such as the third detected capacitance value back to the reference value.

In this embodiment of the present invention, as shown in FIG. 4, the preset particular region includes a first region 100 and a second region 200, and when the detection module 601 detects that changes in the detected capacitance value of touch nodes in the first region 100 are greater than changes in the detected capacitance value of touch nodes in the second region 200, the control module 602 obtains a quantity of touch nodes whose change in the detected capacitance value is greater than the preset detected capacitance threshold value.

Therefore, in the present invention, the detection module 601 detects whether the detected capacitance values of the touch nodes in the preset particular region on the touch sensor 2000 uniformly change, so as to determine whether the cover is in an open or closed state, so that the control module 602 accordingly controls the touch screen 1000 to enter the active or sleep state. That is, when the cover is opened, the touch screen 1000 is automatically woken up to enter a to-be-operated state; when the cover is closed, the touch screen 1000 automatically enters the sleep state. In the present invention, no complex detection circuit needs to be provided in the touch screen 1000, and instead, the detection module 601 is used to detect changes in the detected capacitance value of the touch nodes on the touch sensor, so as to determine whether the cover is in an open or closed state, and accordingly control the touch screen 1000 to enter the active or sleep state.

In the touch screen 1000 according to this embodiment of the present invention, the detection module 601 detects changes in the detected capacitance value in the preset particular region on the touch sensor, and according to the changes in the detected capacitance value of touch nodes in the preset particular region, the control module 602 controls the touch screen 1000 to perform state switching, which is simple and convenient to operate and makes it convenient for use by people. In addition, no complex detection circuit needs to be provided in the touch screen 1000, so that the costs are reduced.

In addition, an embodiment of the present invention further provides a portable touch terminal, including the touch screen provided in the foregoing embodiment. No complex sampling circuit needs to be provided in the touch screen in the portable touch terminal, which reduces the costs, satisfies people's demands in daily life, and improves user experience.

The description of any process or method in the flowcharts or in other manners may be understood as being indicative of including one or more modules, segments or parts of codes of executable instructions for implementing the steps in specific logic functions or processes, and that the scope of the preferred embodiments of the present invention includes other implementations, where the functions may be executed in manners different from those shown or discussed, including executing the functions according to the related functions in a substantially concurrent manner or in a reverse order, which should be understood by those skilled in the art to which the embodiments of the present invention pertain.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system based on a computer, a system including a processor, or other systems capable of fetching instructions from an instruction executing system, device or apparatus and executing the instructions), or for use in combination with the instruction executing system, device or apparatus. As used herein, "a computer readable medium" can be any device that can contain, store, communicate, propagate or transmit programs for use by an instruction executing system, device or apparatus, or can be used with the instruction executing system, device or apparatus. More specific examples of the computer readable medium include (non-exhaustive list): an electrical connecting portion (electronic device) having one or more wirings, a portable computer disk (magnetic device), a random access memory (RAM), a read-only memory (ROM), an erasable programmable read-only memory (EPROM or flash memory), an optical fiber device, and a portable compact disk read-only memory (CD-ROM). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

It should be understood that each of the parts of the present invention may be implemented in hardware, software, firmware, or a combination thereof. In the above embodiments, multiple steps or methods may be realized by software or firmware that is stored in the memory and executed by an appropriate instruction executing system. For example, if it is implemented by hardware, it may be implemented by any one of the following technologies known in the art or a combination thereof as in another embodiment: a discrete logic circuit having a logic gate circuit for implementing logic functions of data signals, an application-specific integrated circuit having an appropriate combined logic gate circuit, a programmable gate array (PGA), and a field programmable gate array (FPGA), etc.

It would be appreciated by those of ordinary skill in the art that all or some of the steps of the method in the above embodiments may be implemented by a program instructing relevant hardware. The program may be stored in a computer readable storage medium. When the program is run, one or a combination of the steps of the method in the embodiments is performed.

In addition, in the embodiments of the present invention, the functional units may be integrated in one processing module, or the functional units may be present separately and physically, or two or more units may be integrated in one module. The above-mentioned integrated module may be implemented in the form of hardware or in the form of a software functional module. If the integrated module is implemented in the form of the software functional module and sold or used as an independent product, the integrated module may also be stored in a computer readable storage medium.

The storage medium mentioned above may be a read-only memory, a magnetic disk or an optical disc.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. The appearances of the phrases throughout this specification are not necessarily referring to the same embodiment or example of the present invention. Furthermore, the particular features, structures, materials, or characteristics described may be combined in any suitable manner in one or more embodiments or examples.

Although the embodiments of the present invention have been shown and described above, it would be appreciated by those of ordinary skill in the art that changes, modifications, substitutions and variations can be made in these embodiments without departing from the principle and spirit of the present invention, and the scope of the present invention is subject to the appended claims and their equivalents.

INDUSTRIAL APPLICABILITY

In the method for controlling a state of a touch screen, the touch screen and the portable touch terminal that are provided in the present invention, the state of the touch screen is controlled by detecting changes in the detected capacitance value in the preset particular region on the touch sensor in the touch screen; therefore, the control method is simple and convenient. Furthermore, by detecting changes in the detected capacitance value in the preset particular region on the touch sensor in the touch screen, the touch screen is controlled to perform state switching, which is simple and convenient to operate and makes it convenient for use by people. In addition, no complex detection circuit needs to be provided in the touch screen, so that the costs are reduced.

What is claimed is:

1. A method for controlling a state of a touch screen, wherein the touch screen comprises a touch sensor and the touch sensor comprises multiple touch nodes, the control method comprising the following steps:
    detecting capacitance values of the multiple touch nodes and determining whether the detected capacitance values of the multiple touch nodes in a preset particular region on the touch sensor all increase or all decrease within a preset time length; wherein the preset particular region comprises a first region and a second region, the second region is different from the first region;
    detecting whether the changes in the detected capacitance values of the multiple touch nodes in the first region are greater than the changes in the detected capacitance values of the multiple touch nodes in the second region when the detected capacitance values of the multiple touch nodes in the preset particular region on the touch sensor all increase or all decrease within the preset time length;
    when the changes in the detected capacitance values of the multiple touch nodes in the first region are greater than the changes in the detected capacitance values of the multiple touch nodes in the second region, obtaining a quantity of touch nodes whose change in the detected capacitance value is greater than a preset detected capacitance threshold value; and
    when the obtained quantity of touch nodes is greater than a preset quantity of touch nodes, controlling the touch screen to perform a state switching.

2. The method for controlling a state of a touch screen according to claim 1, wherein the controlling the touch screen to perform the state switching specifically comprises:
    when the detected capacitance values of the multiple touch nodes whose change in the detected capacitance value is greater than the preset detected capacitance threshold value change from a first detected capacitance value to a second detected capacitance value, controlling the touch screen to enter a sleep state; or
    when the detected capacitance values of the multiple touch nodes whose change in the detected capacitance value is greater than the preset detected capacitance threshold value change from the second detected capacitance value to the first detected capacitance value, controlling the touch screen to enter an active state.

3. The method for controlling a state of a touch screen according to claim 2, wherein the first detected capacitance value is a reference value, when the detected capacitance values of the multiple touch nodes whose change in the detected capacitance value is greater than the preset detected capacitance threshold value change from the reference value to a third detected capacitance value, the touch screen is controlled to enter the sleep state, or when the detected capacitance values of the multiple touch nodes whose change in the detected capacitance value is greater than the preset detected capacitance threshold value change from the third detected capacitance value back to the reference value, the touch screen is controlled to enter the active state.

4. The method for controlling a state of a touch screen according to claim 1, further comprising:
when it is detected that the detected capacitance values in the preset particular region do not change within a preset period of time since the touch screen is controlled to enter an active state, controlling the touch screen to enter a sleep state.

5. A touch screen, comprising:
a touch sensor, the touch sensor comprising multiple touch nodes;
a non-transitory memory storage comprising instructions; and
one or more processors in communication with the touch sensor and the non-transitory memory storage, wherein the one or more processors execute the instructions to:
detect capacitance values of the multiple touch nodes and determine whether the detected capacitance values of the multiple touch nodes in a preset particular region on the touch sensor all increase or all decrease within a preset time length; wherein the preset particular region comprises a first region and a second region, the second region is different from the first region;
detect whether the changes in the detected capacitance values of the multiple touch nodes in the first region are greater than the changes in the detected capacitance values of the multiple touch nodes in the second region when the detected capacitance values of the multiple touch nodes in the preset particular region on the touch sensor all increase or all decrease within the preset time length;
when the changes in the detected capacitance values of the multiple touch nodes in the first region are greater than the changes in the detected capacitance values of the multiple touch nodes in the second region, obtain a quantity of touch nodes whose change in the detected capacitance value is greater than a preset detected capacitance threshold value; and
when the obtained quantity of touch nodes is greater than a preset quantity of touch nodes, control the touch screen to perform a state switching.

6. The touch screen according to claim 5, wherein the one or more processors execute the instructions to:
when the detected capacitance values of the multiple touch nodes whose change in the detected capacitance value is greater than the preset detected capacitance threshold value change from a first detected capacitance value to a second detected capacitance value, instruct the touch screen to enter a sleep state; or
when the detected capacitance values of the multiple touch nodes whose change in the detected capacitance value is greater than the preset detected capacitance threshold value change from the second detected capacitance value to the first detected capacitance value, instruct the touch screen to enter an active state.

7. The touch screen according to claim 6, wherein the first detected capacitance value is a reference value, the one or more processors execute the instructions to:
when the detected capacitance values of the multiple touch nodes whose change in the detected capacitance value is greater than the preset detected capacitance threshold value change from the reference value to a third detected capacitance value, instruct the touch screen to enter the sleep state; or
when the detected capacitance values of the multiple touch nodes whose change in the detected capacitance value is greater than the preset detected capacitance threshold value change from the third detected capacitance value to the reference value, instruct the touch screen to enter the active state.

8. A portable touch terminal, comprising a touch screen, wherein the touch screen comprising:
a touch sensor, the touch sensor comprising multiple touch nodes;
a non-transitory memory storage comprising instructions; and
one or more processors in communication with the touch sensor and the non-transitory memory storage, wherein the one or more processors execute the instructions to:
detect capacitance values of the multiple touch nodes and determine whether the detected capacitance values of the multiple touch nodes in a preset particular region on the touch sensor all increase or all decrease within a preset time length; wherein the preset particular region comprises a first region and a second region, the second region is different from the first region;
detect whether the changes in the detected capacitance values of the multiple touch nodes in the first region are greater than the changes in the detected capacitance values of the multiple touch nodes in the second region when the detected capacitance values of the multiple touch nodes in the preset particular region on the touch sensor all increase or all decrease within the preset time length;
when the changes in the detected capacitance values of the multiple touch nodes in the first region are greater than the changes in the detected capacitance values of the multiple touch nodes in the second region, obtain a quantity of touch nodes whose change in the detected capacitance value is greater than a preset detected capacitance threshold value; and
when the obtained quantity of touch nodes is greater than a preset quantity of touch nodes, control the touch screen to perform a state switching.

9. The portable touch terminal according to claim 8, wherein the one or more processors execute the instructions to:
when the detected capacitance values of the multiple touch nodes whose change in the detected capacitance value is greater than the preset detected capacitance threshold value change from a first detected capacitance value to a second detected capacitance value, instruct the touch screen to enter a sleep state; or
when the detected capacitance values of the multiple touch nodes whose change in the detected capacitance value is greater than the preset detected capacitance threshold value change from the second detected capacitance value to the first detected capacitance value, instruct the touch screen to enter an active state.

10. The portable touch terminal according to claim 9, wherein the first detected capacitance value is a reference value, the one or more processors execute the instructions to:
- when the detected capacitance values of the multiple touch nodes whose change in the detected capacitance value is greater than the preset detected capacitance threshold value change from the reference value to a third detected capacitance value, instruct the touch screen to enter the sleep state; or
- when the detected capacitance values of the multiple touch nodes whose change in the detected capacitance value is greater than the preset detected capacitance threshold value change from the third detected capacitance value to the reference value, instruct the touch screen to enter the active state.

* * * * *